(12) United States Patent
Kling et al.

(10) Patent No.: US 6,291,565 B1
(45) Date of Patent: Sep. 18, 2001

(54) FOOD PACKAGING FILM

(75) Inventors: Susan M. Kling; Bernard E. Obi, both of Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 08/246,019

(22) Filed: May 19, 1994

(51) Int. Cl.$^7$ .................................................. C08K 5/10
(52) U.S. Cl. ..................... 524/312; 524/313; 524/560; 525/902
(58) Field of Search ................. 524/312, 313, 524/560, 568

(56) References Cited

U.S. PATENT DOCUMENTS

| | | |
|---|---|---|
| 2,666,752 * | 1/1954 | Grummitt ............................. 524/312 |
| 3,331,790 | 7/1967 | Scheurlen et al. . |
| 3,397,079 | 8/1968 | De Pugh et al. . |
| 3,524,795 | 8/1970 | Peterson . |
| 3,759,856 | 9/1973 | Rhodes et al. . |
| 4,115,334 | 9/1978 | Gerow . |
| 4,426,477 | 1/1984 | Yasumatsu et al. .................. 524/306 |
| 5,006,368 | 4/1991 | Louks . |

FOREIGN PATENT DOCUMENTS

517572 * 10/1955 (CA) .
621638 * 6/1961 (CA) .

* cited by examiner

*Primary Examiner*—Christopher Henderson
(74) *Attorney, Agent, or Firm*—Nemia C. Damocles

(57) ABSTRACT

Vinylidene chloride polymer compositions comprising a vinylidene chloride polymer and from about 2 to about 12 weight percent of a glycerin ester provide films which exhibit oxygen transmission rates sufficiently low to protect gassy cheeses from spoilage but sufficiently high to let any excess $CO_2$ produced during the cheese curing process escape from the packaged gassy cheeses.

10 Claims, No Drawings

FOOD PACKAGING FILM

BACKGROUND OF THE INVENTION

This invention relates to food packaging films and more particularly to packaging films for gassy cheeses.

Vinylidene chloride polymers have good barrier to oxygen and are well-known to be useful in the fabrication of packaging films for oxygen-sensitive materials, such as fresh and processed meats. Gassy cheeses are specialty products which give off substantial amounts of $CO_2$ after packaging. Although gassy cheeses require some oxygen protection, the packaging bag must be able to expel the excess $CO_2$ produced during the cheese curing process. Thus, packaging films which are suitable for fresh and processed meats are not necessarily suitable for gassy cheeses.

It would be desirable to provide a packaging film having an oxygen transmission rate which is sufficiently low to protect the gassy cheese from spoilage but sufficiently high to let any excess $CO_2$ produced during the cheese curing process to escape from the packaged gassy cheese.

SUMMARY OF THE INVENTION

The present invention is, in one aspect, a vinylidene chloride polymer composition comprising (1) a vinylidene chloride polymer formed from a monomer mixture wherein the major component is vinylidene chloride and the remainder is at least one monoethylenically unsaturated monomer copolymerizable therewith, excluding vinyl chloride and (2) a glycerin ester represented by the formula:

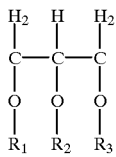

wherein each of $R_1$, $R_2$ and $R_3$ is independently a hydrogen atom or a mixture of a first acyl group and a second acyl group, the first acyl group has 2 carbon atoms and the second acyl group has 10 to 14 carbon atoms, the first acyl group is present in an amount, on the average, of up to 2 mol per mol of glycerin, the second acyl group is present in an amount, on the average, of at least 0.9 mol per mol of glycerin and the total amount of the acyl groups is, on the average, 2.7 to 3.0 mol per mol of glycerin;
the glycerin ester being present in an amount sufficient to provide the composition with an oxygen transmission rate of less than about 9 cc-mil/100 $in^2$-atm-day.

In a second aspect, this invention is a packaging film comprising the vinylidene chloride polymer composition described previously.

In a third aspect, this invention is a multilayer film comprising a core layer of the vinylidene chloride polymer composition described previously and one or more outer layers of a polyolefin film.

The vinylidene chloride polymer composition of the present invention can be used in fabricating packaging films for gassy cheeses.

DETAILED DESCRIPTION OF THE INVENTION

Vinylidene chloride polymers are known and are commercially available. Processes for preparing them, such as by emulsion or suspension polymerization process, are also familiar to persons of ordinary skill in the art. See, for example, U.S. Pat. Nos. 2,558,728; 3,007,903 and 3,879,359, all of which are incorporated herein by reference. Typically, a mixture of vinylidene chloride monomers and one or more monoethylenically unsaturated monomers is emulsified or suspended in an aqueous phase. The polymerization of the monomer mix is usually carried out with heating and agitation. After polymerization is complete, the resulting suspension or emulsion slurry of vinylidene chloride copolymer has a majority of an aqueous phase. The resultant slurry is vacuum stripped. Thereafter, the slurry is cooled down, unloaded and dewatered, and the resin is collected and further dried.

As used herein, the term "vinylidene chloride polymer" encompasses homopolymers of vinylidene chloride, and also copolymers, terpolymers, etc. thereof, wherein the major component is vinylidene chloride and the remainder is one or more monoethylenically unsaturated comonomer copolymerizable with the vinylidene chloride monomer, excluding vinyl chloride.

Monoethylenically unsaturated monomers which can be employed in the practice of the present invention are those which can be polymerized with the vinylidene chloride monomers, excluding vinyl chloride, to form the vinylidene chloride polymers. Preferred monoethylenically unsaturated monomers include alkyl acrylates, alkyl methacrylates, acrylic acid, methacrylic acid, itaconic acid, acrylonitrile, methacrylonitrile, and the like. Preferred monoethylenically unsaturated monomers include acrylonitrile, methacrylonitrile, alkyl acrylates, and alkyl methacrylates. More preferred monoethylenically unsaturated monomers include acrylonitrile, methacrylonitrile, and the alkyl acrylates and alkyl methacrylates having from about 1 to about 8 carbon atoms per alkyl group. Most preferably, the alkyl acrylates and alkyl methacrylates are methyl acrylates, ethyl acrylates, and methyl methacrylates. The most preferred monoethylenically unsaturated monomer is methyl acrylate.

Most preferred vinylidene chloride polymers include polymers formed from about 91 to about 94 weight percent vinylidene chloride and from about 6 to about 9 weight percent of methyl acrylate.

Glycerin esters which can be employed in the practice of the present invention include those which provide vinylidene chloride polymer films an oxygen transmission rate which is sufficiently low to protect the gassy cheese from spoilage but sufficiently high to let any excess $CO_2$ produced during the cheese curing process escape from the packaged gassy cheese. The preferred glycerin esters are those described previously in the summary of the invention. These glycerin esters are known in the art. See, for example, U.S. Pat. No. 4,426,477, incorporated herein by reference.

Most preferred glycerin esters are the distilled acetylated monoglycerides commercially available from Eastman Chemical Company under the trademark KODAFLEX™ EPZ or MYVACET™ 9-08.

While the amount of glycerin esters employed depends on a variety of factors, including barrier requirements and processability of the gassy cheese, in general, the glycerin ester is used in an amount of from about 2 to about 12 weight percent, based on the weight of the composition. For certain gassy cheese formulations, the preferred amount of glycerin ester is from about 6 to about 9 weight percent, based on the weight of the composition and, for other formulations, the preferred amount of glycerin ester is from about 10 to about 11 weight percent, based on the weight of the composition.

The vinylidene chloride composition of the present invention may also contain various additives to impart desirable properties such as, for example, heat stabilizers, light stabilizers, pigments, processing aids, lubricants and the like. Each of these additives is known and several types of each are commercially available.

The vinylidene chloride polymer composition of the present invention can be prepared by adding the glycerin esters to the monomer mix before or during polymerization or to the dry vinylidene chloride resin by dry blending. Preferably, the composition is prepared by adding the glycerin ester to the monomer mix to ensure a more uniform distribution of the glycerin ester in the resulting polymer.

If the composition is prepared by dry blending, the components should be mixed to form a visually uniform admixture. Suitable dry blending equipment includes Hobart mixers, Welex mixers, Henschel high intensity mixers, and the like.

The vinylidene chloride polymer composition of the present invention can be coextruded into a multilayer film with conventional coextrusion machines. Multilayer films employed in packaging gassy cheeses, for example, can have one or more layers comprising the vinylidene chloride polymer composition of the present invention and one or more layers comprising a polyolefin, such as polyethylene. The multilayer film can also have a glue layer disposed between a vinylidene chloride polymer layer and an adjacent polyolefin layer. The glue layer typically comprises ethylene vinyl acetate or any polymer or copolymer having good adhesive properties.

Films fabricated from the vinylidene chloride polymer compositions of the present invention containing from about 2 to about 12 weight percent glycerin ester, based on the weight of the composition, exhibit oxygen transmission rates of from about 0.6 to about 9 cc-mil/100 in$^2$-atm-day. If the vinylidene chloride polymer composition contains from about 6 to about 9 weight percent glycerin ester, based on the weight of the composition, films fabricated therefrom exhibit oxygen transmission rates of from about 1.5 to about 2.5 cc-mil/100 in$^2$-atm-day. If the vinylidene chloride polymer composition contains from about 10 to about 11 weight percent glycerin ester, based on the weight of the composition, films fabricated therefrom exhibit oxygen transmission rates of from about 5 to about 6 cc-mil/100 in$^2$-atm-day.

The following working examples are given to illustrate the invention and should not be construed as limiting its scope. Unless otherwise indicated, all parts and percentages are by weight.

EXAMPLE 1

Fifty-pound blends of SARAN™ MA 119 (trademark of The Dow Chemical Company) (92.36 weight percent vinylidene chloride, 7.64 weight percent methyl acrylate) resin with various levels of distilled acetylated monoglyceride and other additives are prepared using a conventional high intensity blender provided with a jacket containing cooling water. The cooling water maintains the temperature of the blend at a temperature not exceeding 50° C. The resin and additives are blended for 5 minutes and the blends aged for 2 weeks to allow the plasticizer to migrate into the resin particles. The blends are then extruded into blown films using a 2.5-inch blown film extruder. Mineral oil is added to the internal side of the molten films to aid in bubble formation. Immediately after exiting the extruder, the films are quenched in a cool water bath to crystallize the polymer and then passed through a reheating bath to soften the films. The composition of the blends and the film properties are shown in Table I.

TABLE I

| | SARAN MA (wt %) | EVA (wt %) | Stearamide (wt %) | Epoxidized soybean oil (wt %) | Acetylated mono-glyceride (wt %) | OTR[1] |
|---|---|---|---|---|---|---|
| 1 | 91.8 | 5.0 | 0.2 | 1 | 2.0 | 0.664 |
| 2 | 89.8 | 5.0 | 0.2 | 1 | 14.0 | 0.693 |
| 3 | 87.8 | 5.0 | 0.2 | 1 | 6.0 | 1.4715 |
| 4 | 85.8 | 5.0 | 0.2 | 1 | 8.0 | 2.157 |
| 5 | 83.8 | 5.0 | 0.2 | 1 | 10.0 | 4.6505 |
| 6 | 81.8 | 5.0 | 0.2 | 1 | 12.0 | 9.02 |

[1]Reported as cc-mil/100-in$^2$-atm-day and determined for blown films (5–10 mil) at 23° C. and 60% relative humidity according to ASTM Method D-3985-81.

EXAMPLE 2

Into a ten-gallon stirred polymerization reactor is loaded 14000 grams of a monomer mixture which comprises 91.42 weight percent of vinylidene chloride monomer and 8.58 weight percent of methyl acrylate. To the mixture in the reactor is added 896 grams of a distilled acetylated monoglyceride which is commercially available from Eastman Chemical Company under the trademark MYVACET™ 9-08 and thoroughly mixed with the monomers. Deionized water (18000 grams) containing 16.2 grams METHOCEL™ (trademark of The Dow Chemical Company) suspending agent is then added to the mixture.

The reactor is sealed, purged with nitrogen and elevated to a temperature of about 25° C. After polymerization has begun, the temperature is raised to 80° C. and polymerization is allowed to continue for about 8 hours. The polymer slurry is then vacuum stripped of residual monomers, dried, and recovered.

The resultant polymeric composition is extruded into blown films as described in Example 1. The oxygen transmission rate of the films is about 2.5 cc-mil/100 in$^2$-atm-day as determined for 5–10 mil blown films at 23° C. and 60 percent relative humidity according to ASTM Method D-3985-81.

What is claimed is:

1. A vinylidene chloride polymer composition comprising (1) a vinylidene chloride polymer formed from a monomer mixture wherein the major component is vinylidene chloride and the remainder is at least one monoethylenically unsaturated monomer copolymerizable therewith, excluding vinyl chloride, and (2) a glycerin ester represented by the formula:

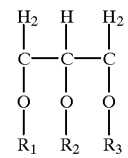

wherein each of $R_1$, $R_2$ and $R_3$ is independently a hydrogen atom or a mixture of a first acyl group and a second acyl group, the first acyl group having 2 carbon atoms and the second acyl group having 10 to 14 carbon atoms, the first acyl group is present in an amount, on the average, of up to 2 mol per mol of glycerin, the second acyl group is present in an amount, on the average, of at least 0.9 mol per mol of glycerin and the total amount of the acyl groups is, on the average, 2.7 to 3.0 mol per mol of glycerin;

the glycerin ester being present in an amount sufficient to provide the composition with an oxygen transmission rate of less than about 9 cc-mil/100 in$^2$-atm-day.

2. The composition of claim 1 wherein the monomer mixture comprises from about 91 to about 94 weight percent vinylidene chloride and from about 6 to about 9 weight percent methyl acrylate.

3. The composition of claim 1 wherein the glycerin ester is present in an amount of from about 2 to about 12 weight percent, based on the weight of the composition.

4. The composition of claim 3 wherein the glycerin ester is present in an amount of from about 6 to about 9 weight percent, based on the weight of the composition.

5. The composition of claim 3 wherein the glycerin ester is present in an amount of from about 10 to about 11 weight percent, based on the weight of the composition.

6. A packaging film comprising the vinylidene chloride polymer composition of claim 1.

7. The packaging film of claim 6 having an oxygen transmission rate of from about 0.6 to about 9 cc-mil/100 in$^2$-atm-day.

8. The packaging film of claim 6 having an oxygen transmission rate of from about 5 to about 6 cc-mil/100 in$^2$-atm-day.

9. The packaging film of claim 6 having an oxygen transmission rate of from about 1.5 to about 2.5 cc-mil/100 in$^2$-atm-day.

10. A vinylidene chloride polymer composition consisting essentially of (1) a vinylidene chloride polymer formed from a monomer mixture wherein the major component is vinylidene chloride and the remainder is at least one monoethylenically unsaturated monomer copolymerizable therewith, excluding vinyl chloride, and (2) a glycerin ester represented by the formula:

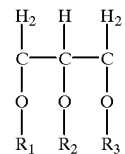

wherein each of $R_1$, $R_2$ and $R_3$ is independently a hydrogen atom or a mixture of a first acyl group and a second acyl group, the first acyl group having 2 carbon atoms and the second acyl group having 10 to 14 carbon atoms, the first acyl group is present in an amount, on the average, of up to 2 mol per mol of glycerin, the second acyl group is present in an amount, on the average, of at least 0.9 mol per mol of glycerin and the total amount of the acyl groups is, on the average, 2.7 to 3.0 mol per mol of glycerin;

the glycerin ester being present in an amount sufficient to provide the composition with an oxygen transmission rate of less than about 9 cc-mil/100 in$^2$-atm-day.

* * * * *